Nov. 25, 1969 — R. W. KELL — 3,480,339

BELT TRACK FOR VEHICLES

Filed Feb. 1, 1968 — 2 Sheets-Sheet 1

INVENTOR.
RALPH W. KELL

BY
R. H. Hatton
ATTORNEY

United States Patent Office 3,480,339
Patented Nov. 25, 1969

3,480,339
BELT TRACK FOR VEHICLES
Ralph W. Kell, Lincoln, Nebr., assignor to The Goodyear Tire & Rubber Company, Akron, Ohio, a corporation of Ohio
Filed Feb. 1, 1968, Ser. No. 702,395
Int. Cl. B62d 55/24
U.S. Cl. 305—35                                    15 Claims

ABSTRACT OF THE DISCLOSURE

A flexible endless belt track for use on a track vehicle having a substantially flat drive cover, a transversely corrugated ground-engaging cover, and containing two spaced layers of transversely extending non-metallic cords such as textile cords separated by a layer of elastomeric-like material. One layer of cords substantially follows the contour of the transverse corrugations and the resulting beam or column effect attained by the spacing of the cord imparts a significant degree of transverse rigidity to the belt. The elastomeric layer may also contain a multitude of short lengths of flexible filamentary material which may be oriented generally in a transverse direction to provide additional transverse stiffness.

BACKGROUND OF THE INVENTION

This invention relates to flexible endless belt tracks of the type designed for use on a track vehicle. More specifically, this invention relates to a new structure for belt tracks used on snowmobile vehicles or the like.

Snowmobiles are small, half-ski, half-track, motor-driven vehicles used for traveling over the snow and ice which have recently become increasingly popular with hunters, trappers, rescue teams, ski patrols, and with winter sports enthusiasts who, for example, use them for racing. These vehicles typically use one or two endless drive belts with lugs or cleats in the outer surface for traction on the slippery surfaces over which they travel. It is extremely important that this type belt be relatively flexible in the longitudinal direction to perform its driving function and yet be substantially stiff or rigid in the transverse direction to prevent belt sag and provide reinforcement for the openings in the belt which engage the sprocket teeth of the vehcile drive. More importantly, the belt must be transversely rigid since it provides the primary vehicle support and flotation over soft snow surfaces.

These belts are generally made of tough, high-quality rubber or the like material and are longitudinally reinforced with textile fabric material such as nylon. Heretofore, transverse rigidity has been accomplished by the use of a plurality of metal rods or bars extending laterally of the belt. For example, in the prior art, as disclosed by Bombardier United States Patent No. 2,899,242, "spaced reinforcing rods extending transversely of the belt within the body thereof" provide the required transverse rigidity. It has also been extremely common in the art for this purpose to bolt or attach transverse metal bars or rods onto a belt surface which additionally provides driving traction.

However, the use of metal rods or other metallic elements to reinforce a belt has many known disadvantages. For example, the cost of manufacturing such a belt is substantially more than that of a belt reinforced by more conventional materials. Furthermore, the incorporation of metallic elements within elastomeric belts has a detrimental effect on the physical properties thereof and may significantly interfere with the belt's functioning. One of the big disadvantages of the metal cross bars when used as lugs or cleats on the ground-engaging traction surface of the belts is the noise created by the metal bar contacting other hard surfaces such as concrete or asphalt. The metal elements within or attached to the belt structure also tend to make the belt relatively heavy and difficult to handle during installation. Furthermore, the metal elements can be bent or broken when the vehicle strikes a rock or other hard object which could make it inoperative leaving the user stranded.

The present invention has eliminated or significantly decreased these previously-mentioned disadvantages by providing the transverse rigidity desired in this type of belt without the use of metal rods or bars. It has been found that substantially the same transverse rigidity as with metal reinforcing elements is obtained by using a belt construction including two layers of spaced non-metallic cords such as textile tire cord or the like with one of its layers of cords substantially following the contour of the transverse cleats. Additional stiffness may also be obtained by using a layer of filament-loaded elastomeric material between these cord layers preferably having the filaments oriented substantially in the transverse direction. The necessary longitudinal strength and stability are obtained by a tension section of conventional construction such as tire cords or square woven fabric.

OBJECTS OF THE INVENTION

It is a primary object of this invention to provide a belt track which is made transversely rigid without the use of metal rods or bars but is longitudinally flexible.

Another important object of this invention is to provide a supporting track for vehicles which is of lighter weight, less costly, and more durable than those currently available.

Another object of this invention is to provide a belt track for track vehicles which will be noiseless in operation.

Other objects and advantages of this invention will become apparent hereinafter as the description thereof proceeds, the novel features, arrangements and combinations being clearly pointed out in the specification as well as the claims thereunto appended.

DESCRIPTION OF THE PREFERRED EMBODIMENTS

Figure 1:
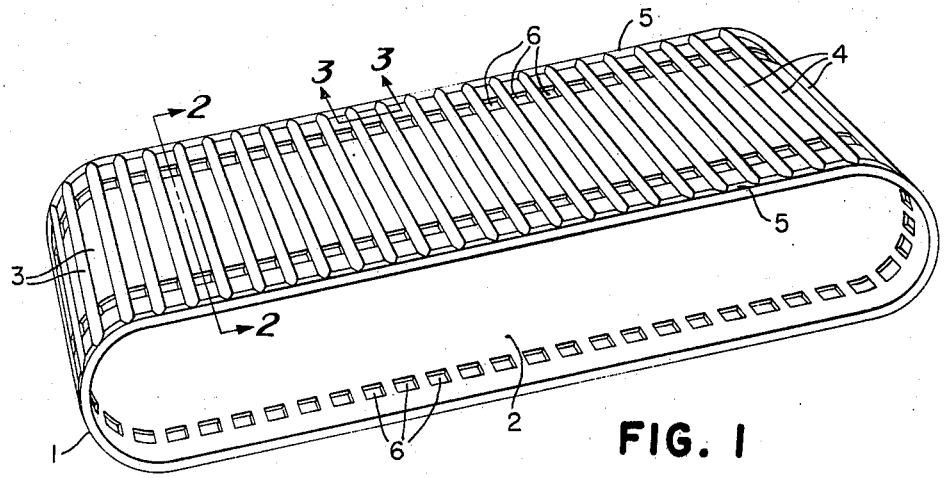
FIG. 1 is a perspective view of the belt track of this invention.

In FIG. 1, a flexible endless belt track 1 of the type used on track vehicles such as snowmobiles or the like has a substantially flat drive contacting surface 2 to engage the face of the vehicle drive sprockets (not shown). A ground-contacting traction surface 3 containing a plurality of transversely extending cleats or corrugations 4 is located on the opposite side of the belt track 1 from the surface 2. The corrugations 4 preferably extend between and connect with ribs or raised portions 5 located along the lateral edges of the belt 1 thereby providing traction in both the longitudinal and transverse directions. In order for the belt track 1 to function as a driving belt, two rows of spaced openings 6 to receive the sprocket teeth of the vehicle drive (not shown) lie between the corrugations 4 and extend through the body portion of the belt 1. Of course, it is to be understood that in some instances, only one row or even more than two rows of openings 6 may be provided depending upon the type of drive being used.

Figure 2:
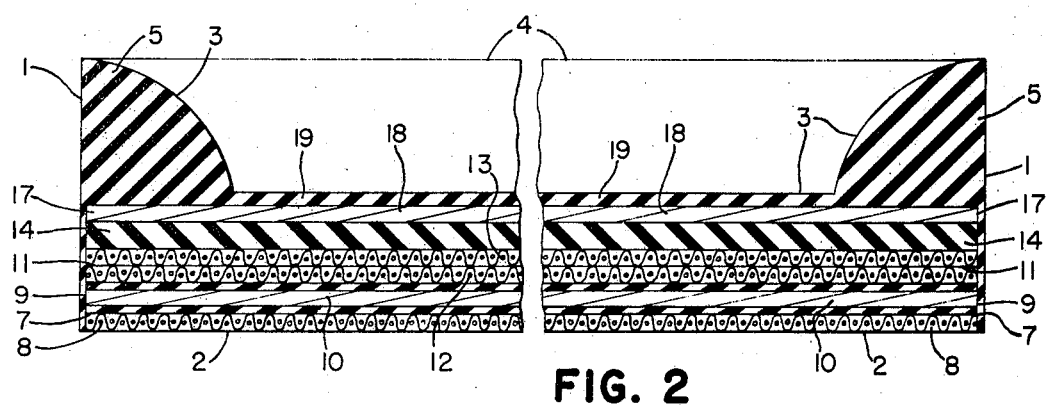
FIG. 2 is an enlarged section taken on line 2—2 of FIG. 1.
Figure 3:
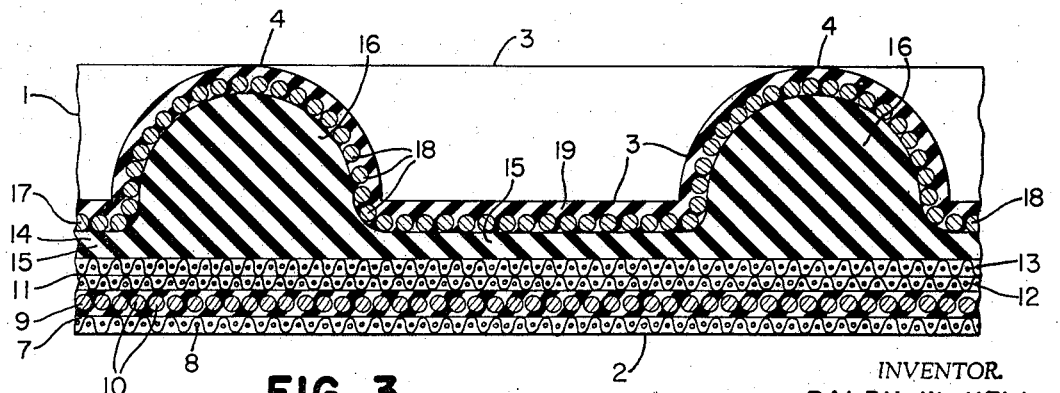
FIG. 3 is an enlarged section taken on line 3—3 of FIG. 1.

The detailed structure of the belt track 1 of this invention is shown in FIGS. 2 and 3. The driving surface 2 of the belt 1 is formed by the drive cover 7 which is composed of a flexible material such as one ply 8 of rubber impregnated square woven textile fabric extending the length and width of the belt 1. The composition of the fabric ply 8 is preferably nylon but may be of any well-known conventional natural or synthetic textile materials such as cotton, rayon, or polyester.

A first layer 9 of transversely extending non-metallic cords 10 is positioned adjacent the drive cover 7. The cords 10 of the first layer 9 preferably may be composed of any of the well-known organic or inorganic textile materials such as cotton, nylon, rayon, polyester, or glass. It, however, has been found that nylon or glass fibers in the form commonly referred to as tire cord provides the belt track 1 with the most significant degree of transverse rigidity when properly spaced as will be hereinafter described.

A tension section 11 is positioned adjacent the first cord layer 9 which is commonly composed of conventional longitudinal reinforcing material. For example, two plies of rubber impregnated square woven nylon fabric 12 and 13 will provide the belt track with the necessary longitudinal strength and stability. Textile tire cords extending longitudinally of the belt will also accomplish the same purpose.

A layer 14 of elastomeric material such as rubber or the like is positioned adjacent to and outwardly from the tension section 11. The layer 14 contains alternating thin portions 15 and thick portions 16 extending transversely across the belt 1. One elastomer suitable for this purpose is a high grade low temperature resistant natural rubber composition.

A second layer 17 or transversely extending non-metallic cords 18 preferably of textile material is positioned adjacent the elastomeric layer 14 and outwardly therefrom. The second cord layer 17 substantially follows the contour of the thick portions 16 and thin portions 15 of the elastomeric layer 14. This may be accomplished, for instance, during the molding operation as a result of rubber displacement which forces the cords 18 into the desired contour.

When the first cord layer 9 and the second cord layer 17 are spaced from each other in this way, there is thereby produced a so-called column or beam effect within the belt which results in a significant degree of transverse stiffness or rigidity being imparted to the belt track 1. This effect may be likened to the stiffness produced by corrugating metal.

A ground engaging cover 19 of elastomeric material is positioned completely over the outer surface of the second cord layer 17 to prevent the exposure of the cords 18. A plurality of rigid corrugations 4 are thereby formed which preferably extend between and join raised portions 5 of elastomeric material which form a continuous longitudinally extending rib along each lateral edge of the belt track as shown in FIG. 1. As shown, the raised portions 5 are at substantially the same height as the cleats or corrugations 4 to thereby form the ground engaging traction surface 3 of the belt 1 as also previously discussed.

The contour of the corrugations 4 and raised portions 5 may be rounded as shown but may also be of a relatively square cross section depending upon the configuration of the particular molding surface used to form the belt track. It should also be noted that the cover 19 and raised portions 5 should be composed of a high grade low temperature resistant elastomer, for instance, natural or synthetic rubber.

The various belting components described may be combined into an integral composite structure by means of conventional vulcanizing apparatus. For instance, a circular mold having the desired surface configuration in which an inside diaphragm exerts pressure to force the unvulcanized belt track into the mold will produce a truly endless snow track. An autoclave arrangement may also be employed to achieve a satisfactory molded product.

Figure 4:
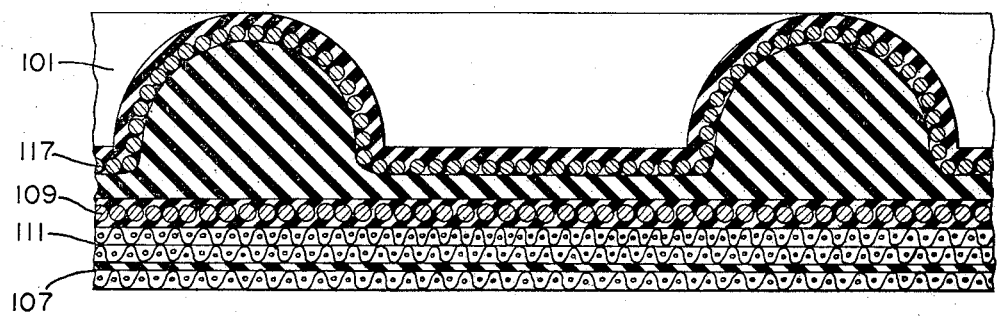
FIG. 4 is a modification of the invention shown in FIG. 3.
Figure 5:
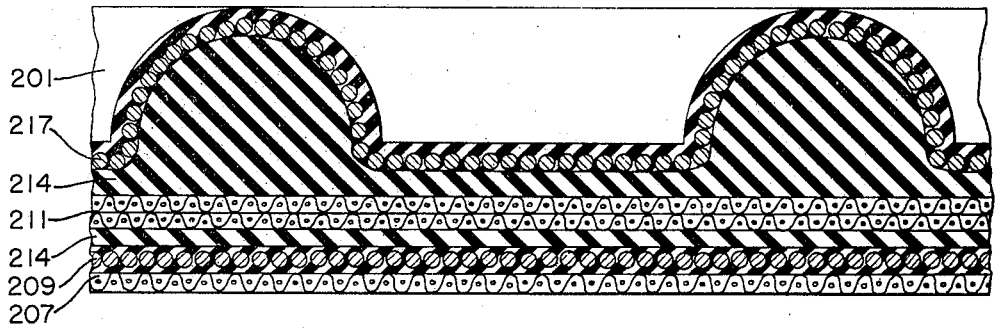
FIG. 5 is another modification of the invention shown in FIG. 3.

The most important feature of the present invention is not the exact positioning of the belting components as previously disclosed but the relative spacing between the first cord layer 9 and second cord layer 17. For example, as shown in FIG. 4, a modification of the invention shown in FIG. 3 the tension section 111 may be positioned between the drive cover 107 and the first cord layer 109 without any significant change in the transverse rigidity of the belt 101. Also as indicated in FIG. 5, the tension section 211 of the belt 201 may also be positioned within the elastomeric layer 214. So long as the first cord layer 209 is spaced at a relatively substantial distance from the second cord layer 217 as compared to the overall belt thickness the column effect will be present to result in the required transverse rigidity.

Figure 6:
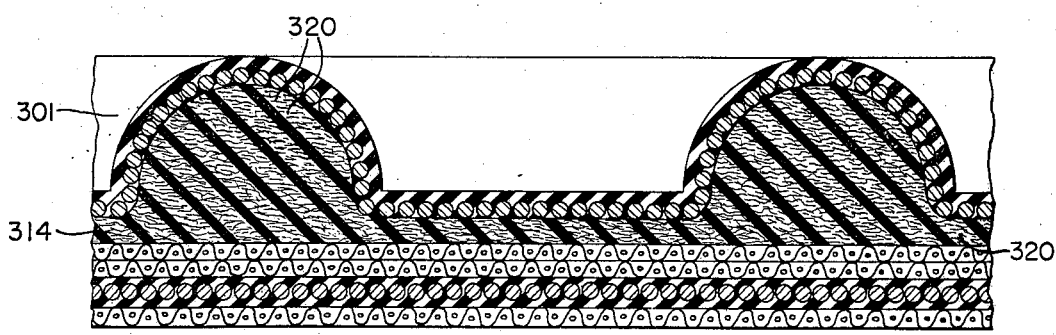
FIG. 6 is another form of the invention shown in FIG. 3.

FIG. 6 shows another form of the invention shown in FIG. 3 in which a multiplicity of short lengths 320 of filamentary material are dispersed substantially throughout the elastomeric layer 314 in order to provide increased stiffness within the belt 301. The filamentary material may be of any flexible material such as organic or inorganic textile, metallic, plastic, cellulosic, ceramic etc. Short lengths of staple fiber of natural or synthetic textile material, such as cotton, nylon, rayon, or polyester have been found to be particularly suitable for this purpose.

The most satisfactory results in achieving a significant increase in transverse rigidity when using most of these previously mentioned materials are obtained by orienting them generally in a transverse direction. This may be accomplished, for instance, by first calendering the filament-containing elastomeric layer to achieve a direction of flow of the material, then cutting the layers in suitable segments, and finally placing the segments across the belt with the filaments predominantly in a transverse direction. However, some materials having great strength such as short lengths of steel wire will provide sufficient rigidity without transverse orientation.

While certain representative embodiments and details have been shown for the purpose of illustrating the invention, it will be apparent to those skilled in the art that various changes and modifications may be made therein without departing from the spirit or scope of the invention.

What is claimed is:
1. A flexible endless belt of reinforced elastomeric material for use on a track vehicle, said belt including:
(A) a drive cover of flexible rubberized fabric material forming one surface of the belt to engage the vehicle drive means;
(B) a longitudinally extending tension section to provide longitudinal strength and stability;
(C) a first layer of individual non-metallic closely spaced cords spaced from said drive cover extending substantially transversely across the width of the belt;
(D) a second layer of individual non-metallic cords spaced from said first cord layer and extending substantially transversely across the width of the belt;
(E) a layer of elastomeric-like material between said first and second cord layers; and
(F) a ground-engaging cover of elastomeric-like material having a plurality of raised transverse corrugations, with the second cord layer substantially following the configuration of the ground-engaging cover but spaced inwardly from the surface thereof.

all of the elements of the belt structure being joined into an integral composite structure to form an endless track.

2. A belt track as claimed in claim 1 wherein the belt also includes raised portions of elastomeric-like material at the edges thereof forming a substantially continuous rib extending along each edge for the entire belt length into which the transversely extending corrugations terminate thereby forming a ground-engaging traction surface on the belt.

3. A belt track as claimed in claim 1 wherein the tension section is positioned between the drive cover and the first cord layer.

4. A belt track as claimed in claim 1 wherein the tension section is positioned within the layer of elastomeric-like material.

5. A belt track as claimed in claim 1 wherein the layer of elastomeric-like material contains a multiplicity of short lengths of filamentary material dispersed substantially uniformly therein.

6. A belt track as claimed in claim 5 wherein:
(A) the drive engaging means is at least one longitudinal row of spaced openings through the belt and between the transverse corrugations with the track vehicle driving means engaging said openings to drive said belt track;
(B) the drive cover is at least one ply of square woven textile fabric impregnated with elastomeric material and extending substantially the length and width of the belt and adjacent said first cord layer;
(C) the tension section lies adjacent the opposite side of said first cord layer;
(D) the first and second cord layers are composed of textile material; and
(E) the filamentary material in the filament-containing layer is a multitude of lengths of staple textile fibers dispersed therein and being generally oriented in a transverse direction, said filament-containing layer being disposed between said first and second cord layers and positioned adjacent the tension section and outwardly therefrom.

7. A belt track as claimed in claim 1 wherein the tension section is positioned between the first and second cord layers.

8. A belt track as claimed in claim 7 wherein the drive cover extends substantially the length and width of the belt adjacent said first cord layer, and the tension section lies adjacent the opposite side of said first cord layer.

9. A belt track as claimed in claim 7 wherein the tension section is positioned within the layer of elastomeric-like material.

10. A belt track as claimed in claim 7 wherein the drive cover is at least one ply of square woven textile fabric impregnated with elastomeric-like material, and the first and second cord layers are composed of textile fabric material.

11. A belt track as claimed in claim 7 wherein the layer of elastomeric-like material contains a multiplicity of short lengths of filamentary material dispersed substantially uniformly therein.

12. A belt track as claimed in claim 11 wherein the filament-containing layer is a multitude of lengths of stable textile fibers dispersed therein and generally oriented in a transverse direction.

13. A generally transversely rigid, longitudinally flexible belt track for use on a snowmobile vehicle including at least one endless drive belt comprising:
(A) a body portion having at leat one row of spaced openings therein to receive the sprocket teeth of the snowmobile drive;
(B) a drive cover including at least one ply of square woven textile fabric impregnated with elastomeric material and extending substantially the length and width of the belt;
(C) a first layer of closely spaced transversely extending individual textile fabric cords positioned adjacent said drive cover;
(D) a longitudinally extending tension section adjacent said first cord layer;
(E) a layer of elastomeric material positioned adjacent said tension section and outwardly therefrom and having alternating thick and thin portions therein along the belt length and extending transversely thereof.
(F) a second layer of closely spaced transversely extending individual textile fabric cords positioned adjacent said elastomeric layer and outwardly therefrom, said cords substantially following the contour of said thick and thin portions of the elastomeric layer; and
(G) a ground-engaging cover of elastomeric material on the outer surface of the second cord layer to form thereby a plurality of transversely rigid corrugated cleats on the ground-engaging surface of the belt track, all of the belt components being molded into an integral composite structure to form an endless belt track for use on such snowmobile vehicle.

14. A belt track as claimed in claim 13 wherein each belt also includes raised portions of elastomeric material extending the entire length of the belt at each lateral edge thereof and joined to the ends of the transverse cleats, the raised portions forming a continuous rib along each edge of the belt of substantially the same height as said cleats.

15. A belt track as claimed in claim 13 wherein the elastomeric layer of each belt contains a multitude of short lengths of staple textile fiber substantially uniformly disposed therein, said fibers being oriented in a generally transverse direction.

References Cited

UNITED STATES PATENTS

| | | | |
|---|---|---|---|
| 2,476,828 | 7/1949 | Skromme | 305—38 |
| 2,793,150 | 5/1957 | Deaves. | |
| 3,118,709 | 1/1964 | Case | 305—37 |

RICHARD J. JOHNSON, Primary Examiner